(12) United States Patent
Grijalva Varillas (10) Patent No.: US 9,533,810 B2
(45) Date of Patent: Jan. 3, 2017

(54) PACKAGING FOR PRESERVING FRUITS AND VEGETABLES, AND MANUFACTURING METHOD

(71) Applicant: Sergio Fernando Grijalva Varillas, Zapopan (MX)

(72) Inventor: Sergio Fernando Grijalva Varillas, Zapopan (MX)

( * ) Notice: Subject to any disclaimer, the term of this patent is extended or adjusted under 35 U.S.C. 154(b) by 0 days.

(21) Appl. No.: 14/894,818

(22) PCT Filed: Oct. 3, 2013

(86) PCT No.: PCT/MX2013/000118
§ 371 (c)(1),
(2) Date: Nov. 30, 2015

(87) PCT Pub. No.: WO2015/050423
PCT Pub. Date: Apr. 9, 2015

(65) Prior Publication Data
US 2016/0101916 A1    Apr. 14, 2016

(51) Int. Cl.
*B65D 65/40* (2006.01)
*B32B 7/02* (2006.01)
(Continued)

(52) U.S. Cl.
CPC .............. *B65D 65/40* (2013.01); *B32B 3/08* (2013.01); *B32B 3/266* (2013.01); *B32B 5/142* (2013.01);
(Continued)

(58) Field of Classification Search
CPC ......... B65D 33/01; B65D 31/04; B65D 31/10; B65D 65/40; B65D 81/22; B65D 81/26; B65D 81/264; B65D 85/34; B65D 75/008; B65D 31/02; B29C 66/232; B29C 65/00
(Continued)

(56) References Cited

U.S. PATENT DOCUMENTS 4,503,561 A * 3/1985 Bruno ................... B65D 33/01
383/102
4,672,684 A * 6/1987 Barnes ................... B65D 33/01
383/102
(Continued)

FOREIGN PATENT DOCUMENTS

CN    101919347 A1   12/2010
JP    2006298450 A1   11/2006

*Primary Examiner* — Peter Helvey
(74) *Attorney, Agent, or Firm* — Kintner IP, LLC; Mary Frances Ludwig (57) ABSTRACT

A lightweight packaging container for the preservation of fruits and vegetables is made from flexible polymeric materials that permit controlled ventilation, enabling the packaged produce to remain hydrated for a longer time, keeping them fresh without the need for refrigeration. The body of the packaging is made of layered polymeric materials. An embodiment includes an outer layer of polymeric material having a structural function, a second layer of porous polymeric material having a moisture-absorbing function, and a third layer of polymeric material containing micro-perforations that have a moisture-retaining function. The materials are pre-arranged in the center of the wider outer strip. The multilayer material is folded and the edges are heat-sealed to form a packaging bag with a flat base. A unique heat-sealing method allows only the edges of the polymeric layers to be joined, leaving the center portion thereof layered but not laminated.

5 Claims, 7 Drawing Sheets

(51) Int. Cl.
*B65D 81/22* (2006.01)
*B65D 81/26* (2006.01)
*B65D 85/34* (2006.01)
*B32B 27/08* (2006.01)
*B32B 27/32* (2006.01)
*B32B 3/26* (2006.01)
*B65D 75/00* (2006.01)
*B65D 30/08* (2006.01)
*B32B 3/08* (2006.01)
*B32B 27/12* (2006.01)
*B32B 5/14* (2006.01)
*B32B 5/22* (2006.01)
*B32B 5/26* (2006.01)
*B32B 5/02* (2006.01)
*B32B 7/04* (2006.01)

(52) U.S. Cl.
CPC . *B32B 5/22* (2013.01); *B32B 5/26* (2013.01); *B32B 7/02* (2013.01); *B32B 27/08* (2013.01); *B32B 27/12* (2013.01); *B32B 27/32* (2013.01); *B65D 31/02* (2013.01); *B65D 75/008* (2013.01); *B65D 81/22* (2013.01); *B65D 81/26* (2013.01); *B65D 81/264* (2013.01); *B65D 85/34* (2013.01); *B32B 5/022* (2013.01); *B32B 7/045* (2013.01); *B32B 2262/0253* (2013.01); *B32B 2262/06* (2013.01); *B32B 2262/062* (2013.01); *B32B 2307/31* (2013.01); *B32B 2307/518* (2013.01); *B32B 2307/546* (2013.01); *B32B 2307/726* (2013.01); *B32B 2307/7246* (2013.01); *B32B 2439/06* (2013.01); *B32B 2439/46* (2013.01); *B32B 2439/70* (2013.01)

(58) Field of Classification Search
USPC .......................................................... 383/102
See application file for complete search history.

(56) References Cited

U.S. PATENT DOCUMENTS

| | | | | |
|---|---|---|---|---|
| 5,059,036 | A * | 10/1991 | Richison | B31B 19/90 383/102 |
| 5,839,572 | A * | 11/1998 | Yeager | B31B 1/02 206/204 |
| 6,035,611 | A | 3/2000 | Lerner | |
| 6,113,269 | A * | 9/2000 | DeMatteis | B29C 65/004 383/10 |
| 6,120,817 | A * | 9/2000 | Archibald | B65D 33/01 383/102 |
| 6,286,681 | B1 * | 9/2001 | Wilfong, Jr. | B65D 33/001 206/554 |
| 6,767,131 | B2 * | 7/2004 | Taheri | B65D 33/2541 383/102 |
| 6,880,971 | B1 * | 4/2005 | Huseman | A47F 13/085 206/554 |
| 2006/0222271 | A1 * | 10/2006 | Yoffe | B31B 19/36 383/102 |
| 2007/0054075 | A1 | 3/2007 | Wehrmann | |
| 2007/0263948 | A1 * | 11/2007 | Buchman | B65D 33/01 383/103 |
| 2008/0031553 | A1 * | 2/2008 | Tokita | B65D 33/2508 383/113 |
| 2008/0144979 | A1 * | 6/2008 | Capt | B65D 31/04 383/207 |
| 2014/0233868 | A1 * | 8/2014 | Knutzon | B65D 75/46 383/40 |

* cited by examiner

PACKAGING FOR PRESERVING FRUITS AND VEGETABLES, AND MANUFACTURING METHOD

CROSS REFERENCE TO RELATED APPLICATION

This application is a national stage filing of, and claims the benefit of priority under 35 USC 365 to, International Patent Application No. PCT/MX2013/000118, filed 3 Oct. 2013, which is hereby incorporated by reference in its entirety.

TECHNICAL FIELD

The invention presented herein pertains to an inexpensive packaging container designed to preserve fruits and vegetables, wherein flexible polymeric materials are used to control ventilation, keeping the packaged fruits or vegetables hydrated for a greater number of days, therefore keeping them fresh longer.

BACKGROUND

There are currently two types of packaging containers on the market for fruits and vegetables, rigid and flexible, neither of which having controlled ventilation. The first type of packaging container for fruits and vegetables generally consists of a rigid plastic body made from a single piece of plastic. The body is thermoformed into a single body containing indentations and a hinge that allows the lid to fold open and closed. These rigid packaging containers are made from a single piece of plastic material of considerable thickness in order to ensure its rigidity.

The second type of packaging container for fruits and vegetables generally consists of a flexible plastic body made of a single body or bag-shaped container. The bag is generally made from a plastic material of variable thickness. Once these packaging bags are filled with fruits and/or vegetables, they cannot be displayed upright or vertically at the point of sale, due to the fact that they do not have a flat supportive base. Both types of packaging containers present different problems, which need to be resolved. Although inexpensive, they do not ensure internal moisture control, which causes daily loss of hydration to the packaged fruits and vegetables. Another drawback is the weight loss experienced by the packaged fruits and vegetables due to the dehydration thereof. These products are sold by weight, and with each passing day, their value decreases. Additionally, as is the case with the rigid plastic packaging container, adhesive labels are printed and applied to the container for their sale. The labels and their application increase the cost of the container. The invention presented herein proposes to solve the mentioned problems by using porous polymeric and micro-perforated materials that enable controlled ventilation of the gases emitted by the fruits and vegetables, as well as controlling the internal moisture within the packaging container.

Furthermore, a process is presented for the manufacture of polymeric rolls consisting of three or more layers, by heat-sealing the edges of inner polymeric film layers down the middle section of the main polymeric film roll.

DETAILED DESCRIPTION

The present packaging container can be made inexpensively, guarantees longer preservation of packaged products without relying upon refrigeration, and also has the product information and advertising printed on the surface of the flexible packaging container.

The main feature of the present packaging container is to provide a flexible, bag-shaped container with a flat base that can reduce the dehydration that occurs in packaged fruits and vegetables by using porous polymeric or micro-perforated materials, as well as manufacturing techniques that decrease the cost of the packaging container in comparison with those currently in use.

A method of manufacturing the packaging container includes a special manufacturing system of heat-sealing three or more polymeric sheets depending on the level of hydration that one desires to retain in the packaged product. The heat-sealing is achieved by heat-sealing the edges of two or more polymeric sheets down the middle of a larger third polymeric sheet An advantage of this packaging container is that it is made of materials that are 100% recyclable. In addition, the packaging container reduces the volume of material used for packaging. Thus, there will be considerable savings in transport costs.

In order to form the packaging container, flat strips of polymeric material must be used. Three or more polymeric strips are used; the first and widest strip forms the outer surface of the packaging container and serves a structural function. Two successive strips of material are placed down the middle of the first polymeric strip, preferably being a porous polymeric strip that functions as an absorbing agent and a micro-perforated material that retains moisture. These strips or layers of polymeric materials are heat-sealed and bonded together to ensure stability and maintain their original placement during the construction and folding of the packaging container. This system of fusing the polymeric sheets together at their edges has been developed particularly for this packaging container. The process of heat-sealing down the middle as well as the manufacturing process are both unique and are part of the invention presented herein. The heat-sealing of the middle section is achieved by running the polymeric sheets between metal rollers facing each other. As they pass through the rollers, heat and pressure are applied wherein the polymeric sheets are joined to the plastic strip which is then later cut laterally, producing a rectangle with three strips of polymeric materials down the middle of it.

The rectangle is then folded into three sections at its center and the edges thereof are sealed and bonded by heat. Once the bag-shaped packaging container is formed, the side edges are sealed and bonded, creating a load-bearing bag with a flat, rectangular-shaped base. A second variant for controlling internal moisture is achieved by using three or more strips of flat polymeric and micro-perforated material, the first being wider and the latter two being placed in the middle of the perforated surface. An additional number of variants can be achieved by integrating absorbent materials such as but not limited to: cellulose, cotton, hemp, sugarcane bagasse, and similar materials. Due to the juxtaposition of the different layers of polymeric, porous, and micro-perforated materials, the bag-shaped package is capable of controlling the moisture within the package as well as reducing the amount of water lost. Dehydration and weight loss of fresh packaged products is reduced by 10% to 20% due to the regulation of lost moisture.

DETAILED DESCRIPTION OF THE INVENTION

Further features and advantages of the invention will be described, particularly, but not exclusively, that of a preferred embodiment of the packaging container designed for longer preservation of fruits and vegetables, illustrated herein, including but not limited to the attached drawings.

Figure 1:
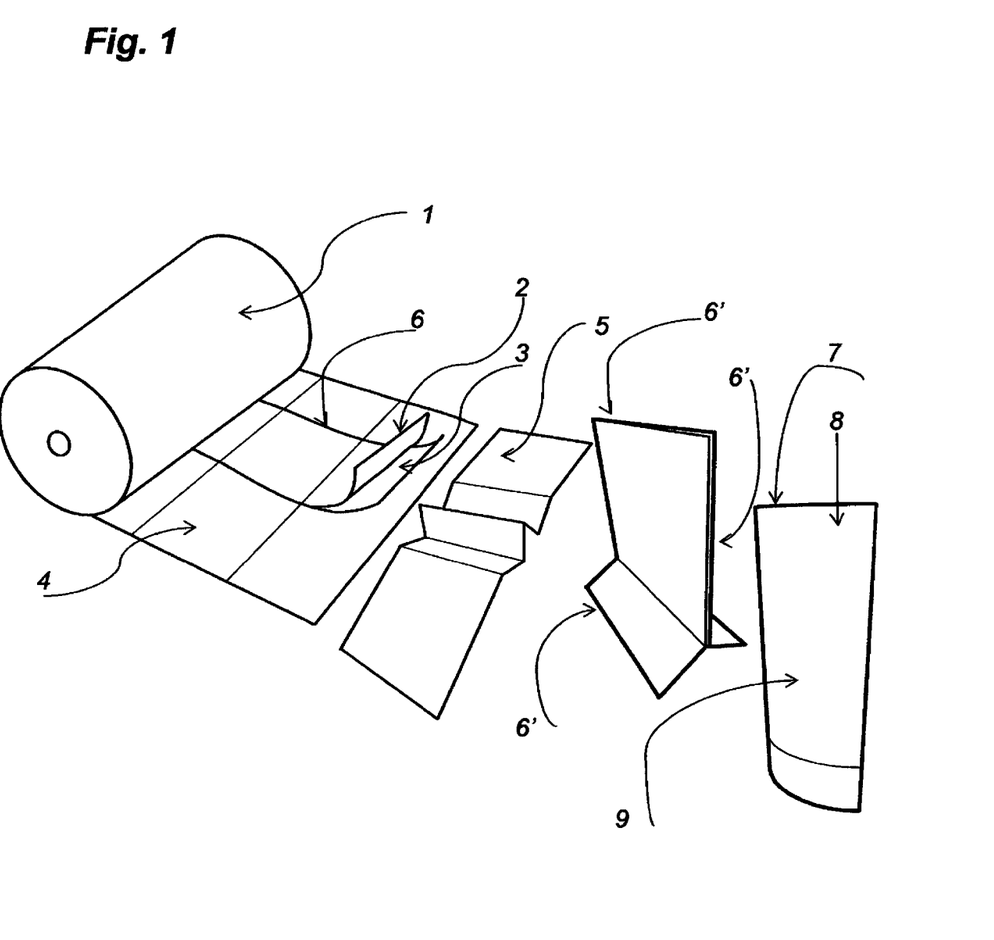
FIG. 1 is a perspective view of the manufacturing process of packaging for preserving fruits and vegetables.

FIG. 1 is a perspective view of an exemplary manufacturing process of the bags. Starting with a roll (1) of three or more polymeric materials, in which two or more inner layers (2) and (3) are joined together at their edges by a heat-sealing process (6) after which the roll is cut into rectangular sections (4) which are then later folded into six sections (5). Next the bag is heat-sealed at the sides (6') producing a flat-bottomed bag that is closed on three sides. The top (7) of the bag is open, which serves as an opening to fill the bag with fresh produce such as fruits or vegetables; this opening is also later sealed together through heat-sealing (8).

Figure 2:
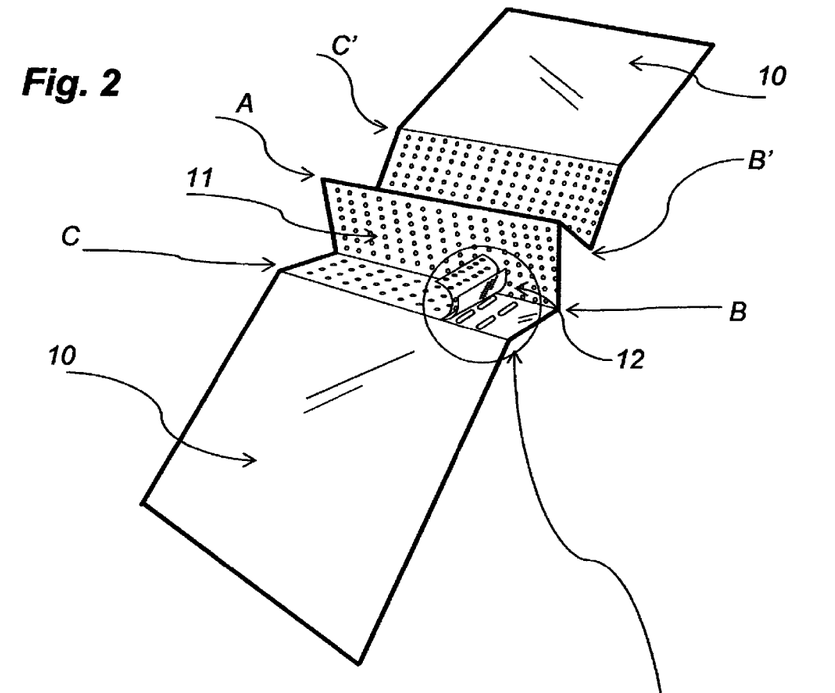
FIG. 2 is a perspective view of the different layers of polymeric films that form the body of the packaging container.

The finished packaging container, designated as (9), is shown ready to be filled with fruits or vegetables. FIG. 2 is a perspective view of the different layers of polymeric films that form the body of the packaging container, and how they are joined together to form a single sheet of material. A transparent piece of polymeric material, first layer (10), contains perforations in a perforated central region between folds (C) and (C'). At least one strip of polymeric materials is placed down the center of first layer (10). In the shown embodiment, a micro-perforated polymeric material (11), and a third porous material (12) made of non-woven plastic fabric material are illustrated in the construction detail. The packaging materials are folded along five folds (A, B, B', C, and C').

Figure 3:
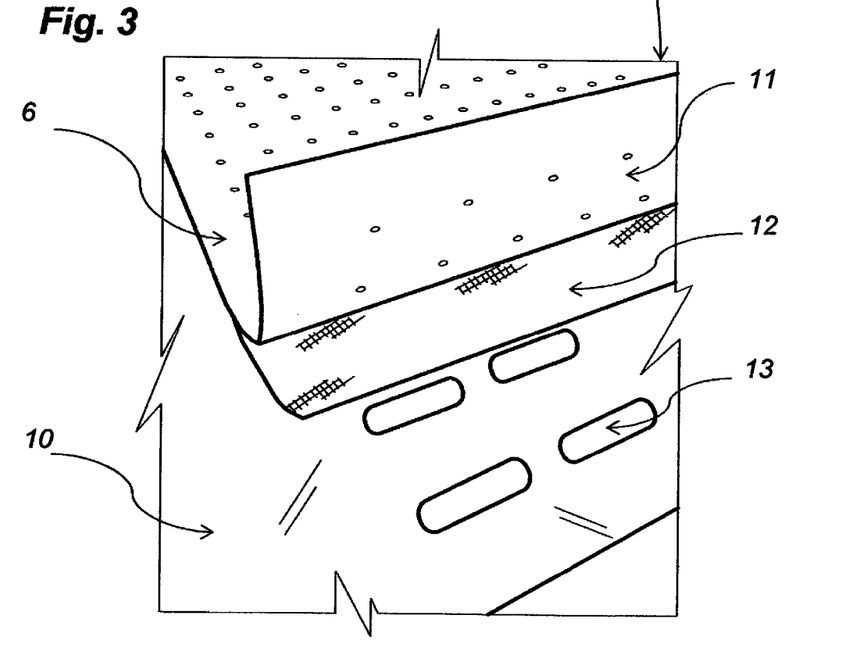
FIG. 3 is a perspective detail of how the different layers of polymeric material are sealed together.

FIG. 3 is a perspective detail of how the different layers of polymeric material are joined together, namely the micro-perforated layer (11), the non-woven fabrics layer (12), and the transparent layer (10) which contains varying perforations (13) throughout the length and width of the area located between folds (C) and (C') to regulate the ventilation. The layers of polymeric material in the center, (11) and (12), are joined only at their edges with the layer of transparent material (10).

Figure 4:
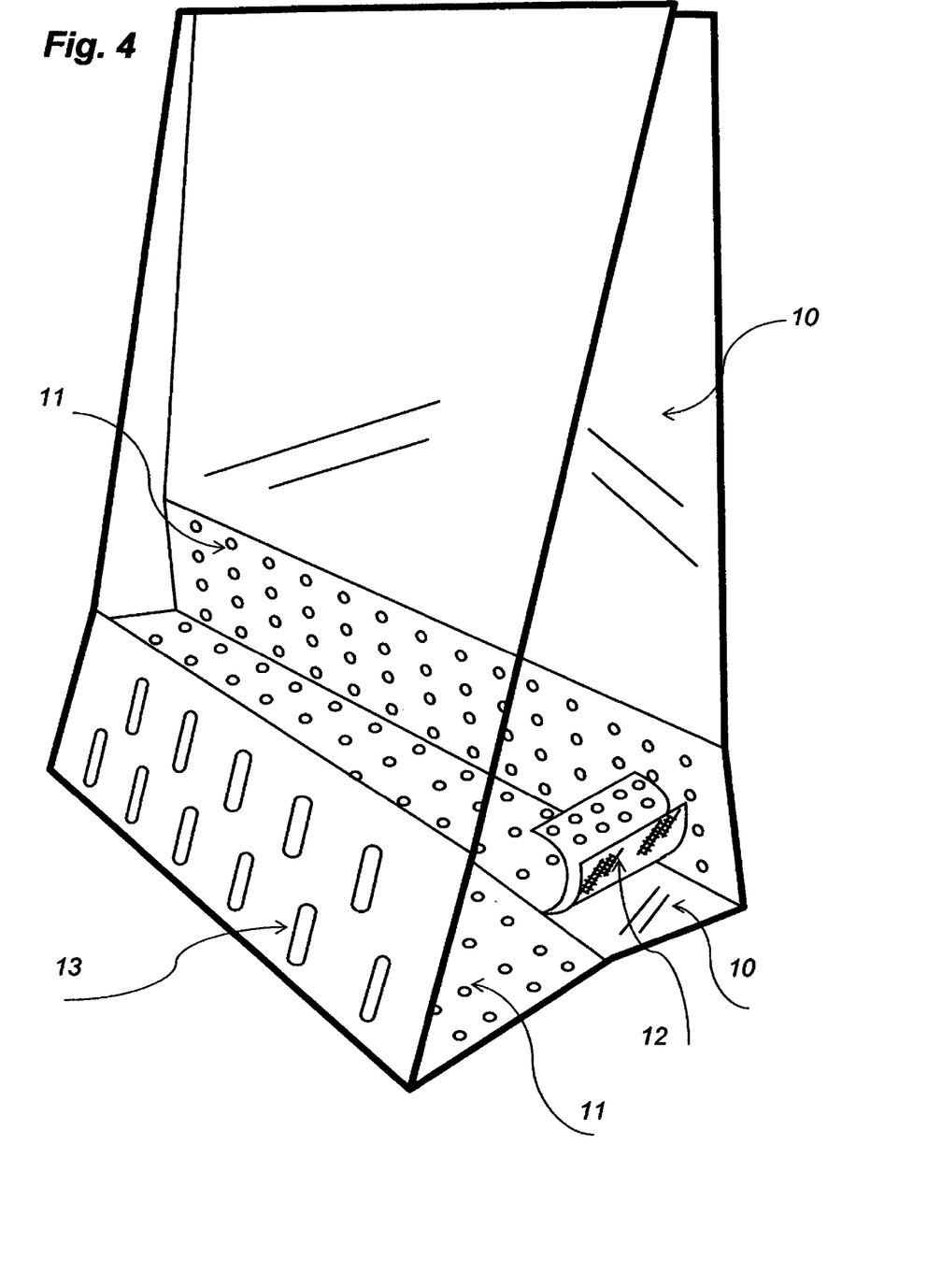
FIG. 4 is a cutaway perspective view of different layers of polymer films that form the body of the package.

FIG. 4 is a cutaway perspective view of different layers of polymer films that form the body of the package, and how they join to form a single sheet of material. This illustration shows a transparent piece of polymeric material (10), with a polymeric strip placed in the center, consisting of micro-perforated material (11), a third non-woven plastic fabric material (12) allowing controlled ventilation, and perforations (13) of variable dimension which help with the regulation of ventilation.

Figure 5:
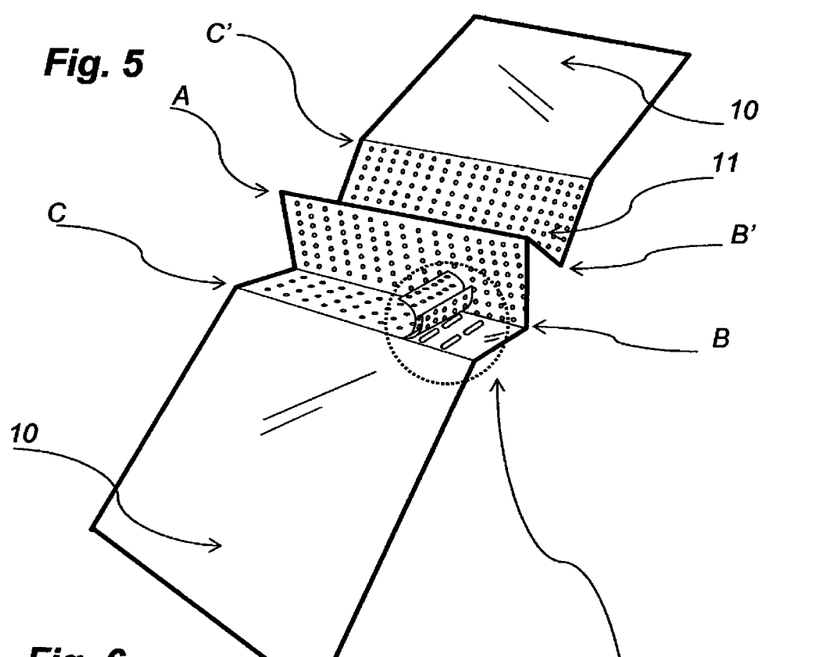
FIG. 5 is a perspective view of another embodiment of the different layers of polymeric films that form the body of the package.

FIG. 5 is an illustrative view showing a variation of the different layers of polymeric films that form the body of the package, and how they join to form a single sheet of material. A transparent polymeric material (10) with a sheet of plastic materials placed in the center, a micro-perforated polymeric material (11), and a third micro-perforated material (11) are shown in the construction detail.

Figure 6:
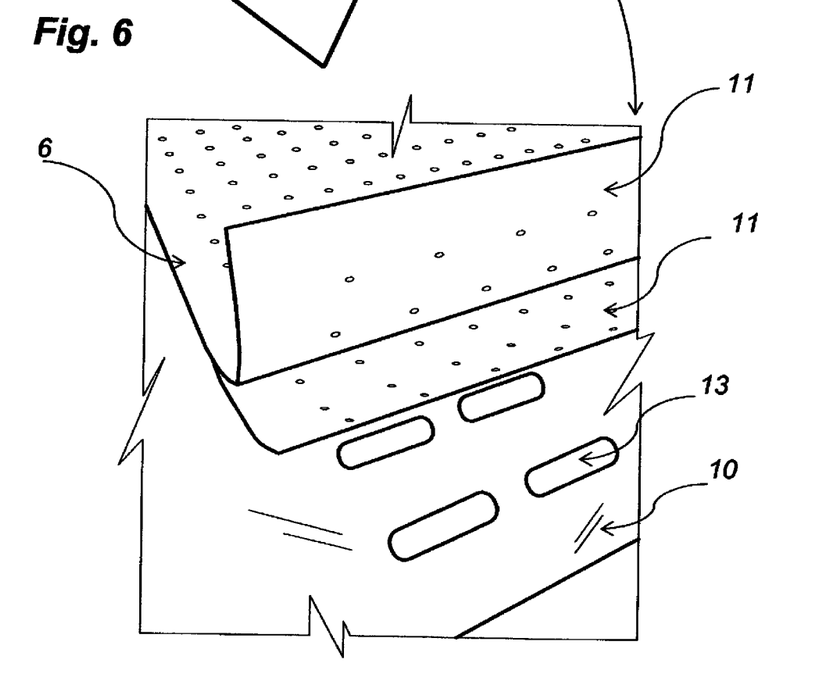
FIG. 6 is a perspective detail view of another embodiment of how the different layers of the packaging are sealed together.

FIG. 6 is a perspective detail view of how the different layers of micro-perforated polymeric materials (11) are joined to the transparent layer (10) which has perforations (13) in order to regulate ventilation.

Figure 7:
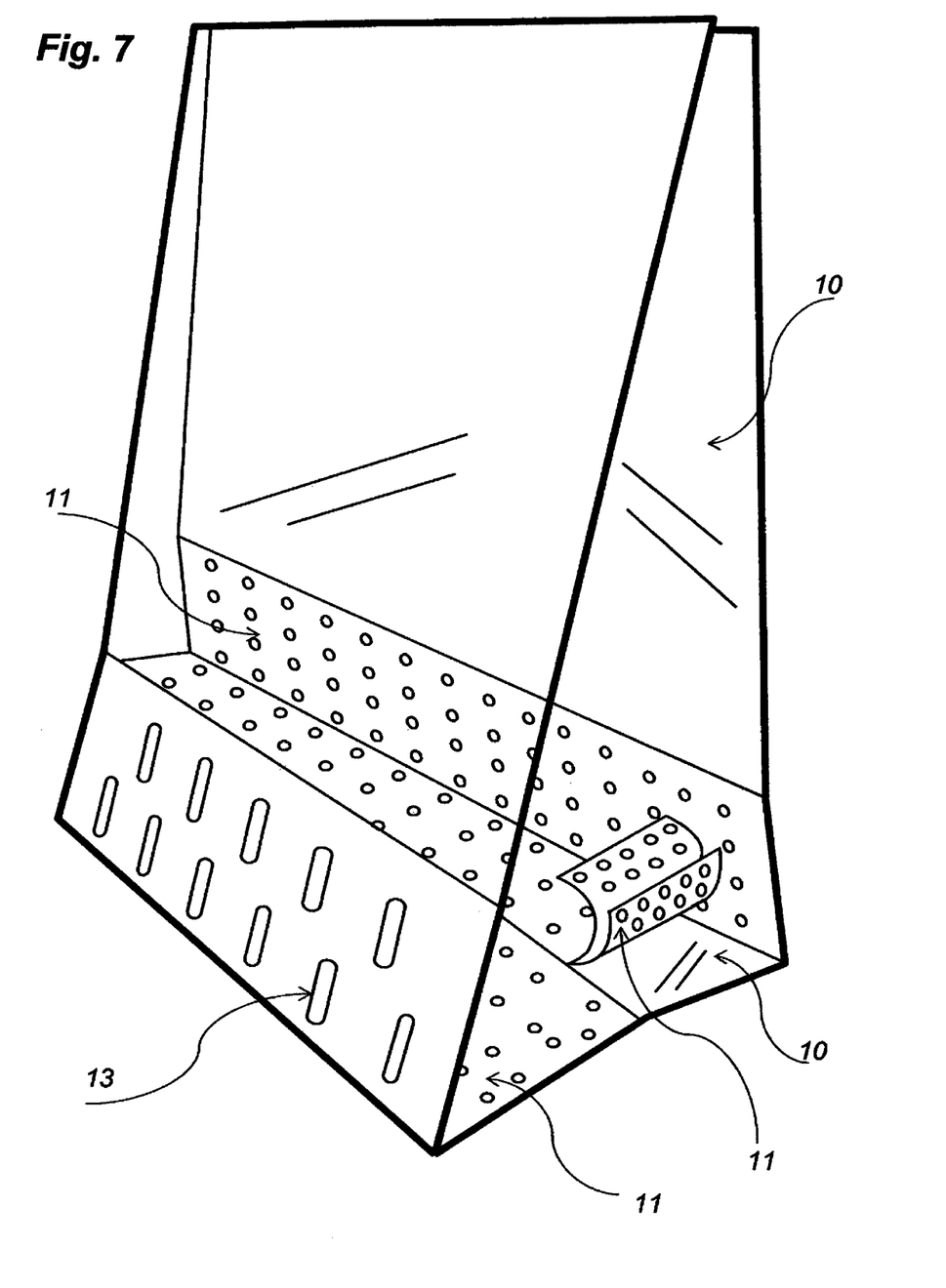
FIG. 7 is a cutaway perspective view of another embodiment of the different layers that form the body of the packaging container.

FIG. 7 is a cutaway illustration of the different layers of polymeric films that form the body of the packaging container, and how they join to form a single sheet of material. The illustration shows a transparent sheet of plastic material (10) with a sheet of polymeric materials placed in the center, consisting of a micro-perforated material (11), and a third sheet of micro-perforated plastic material (11) with perforations (13) of varying sizes, which help regulate ventilation.

Figures 8, 9:
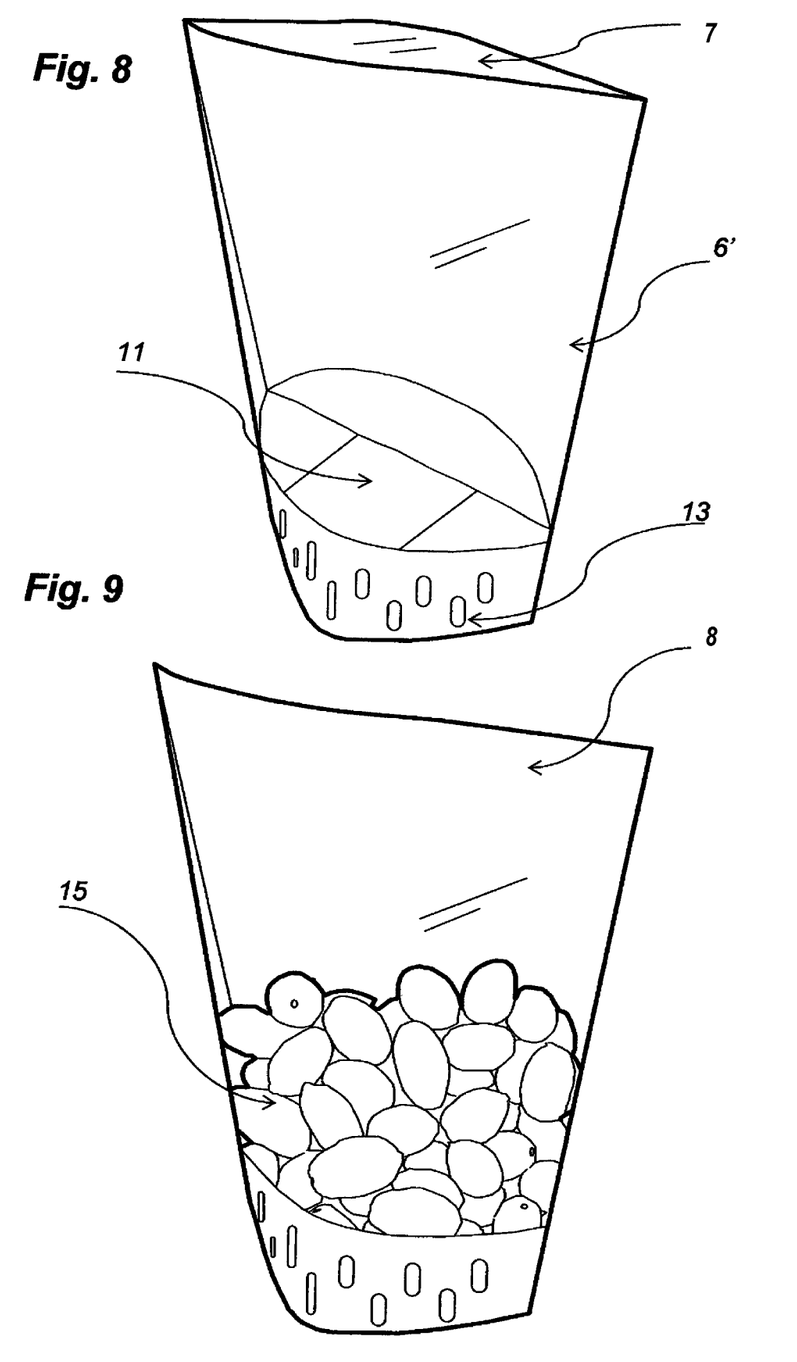
FIG. 8 is a perspective view of the bag folded and sealed on its sides and open at the top.
FIG. 9 is a perspective view of the bag filled with fresh food and with the top sealed.

FIG. 8 shows a perspective view of the bag folded and sealed on its sides (6') and open at the top (7) in order to fill it with fruits or vegetables. The bottom of the bag is shown to have perforations (13) and layers of micro-perforated materials (11) in order to regulate the ventilation.

FIG. 9 shows a view of the bag, wherein the top (8) has been sealed after having been filled with fruit, vegetables, or some other fresh food (15).

In relation to the cited figures, the container designed for longer preservation according to the drawings, shown generally by reference to FIG. 4 and FIG. 7, includes a body that is comprised of a polymeric material (10) preferably polyethylene (PE) or similar material that is a significantly flat film with perforations (13) which are made by calendering during the manufacturing stage. Additionally the flat-based bag-shaped package has at its base a layer of non-woven synthetic textile material fabric (12) preferably made of polypropylene (PP) as well as a layer of polymeric material (11), preferably made of biaxially-oriented polypropylene (BOPP) or similar material in addition to the micro-perforated layer which is attached to the polymeric material by heat-sealing.

In order to maintain its shape, the sides of the flat-based packaging bag are folded (FIG. 4, FIG. 7, and FIG. 8) and then heat-sealed (6') using pressure to ensure that the bag can efficiently hold the product.

As an alternative to using three plastic films, (10), (11), and (12), material (12) can be substituted with material (11); FIG. 6 consists of biaxially-oriented polypropylene (BOPP) and micro-perforated materials.

Figure 10:
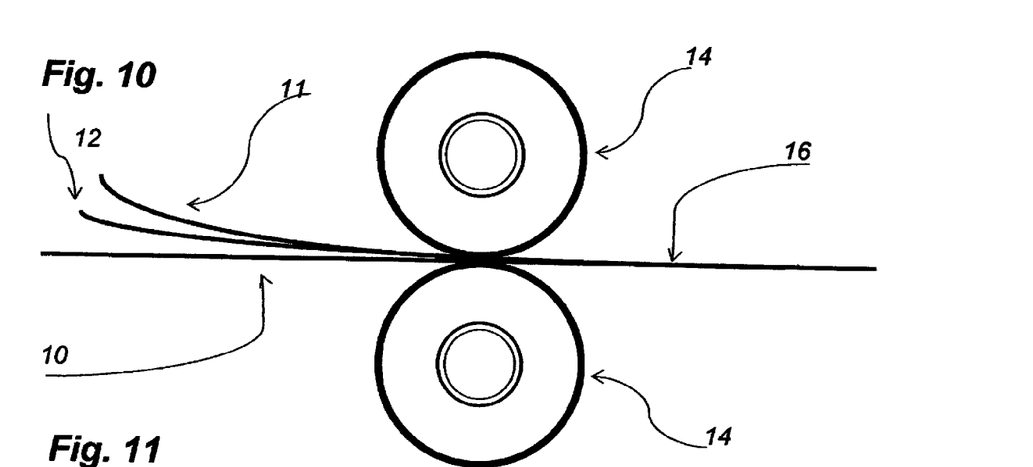
FIG. 10 is a cross-sectional view of a heat-sealing process.
Figure 11:
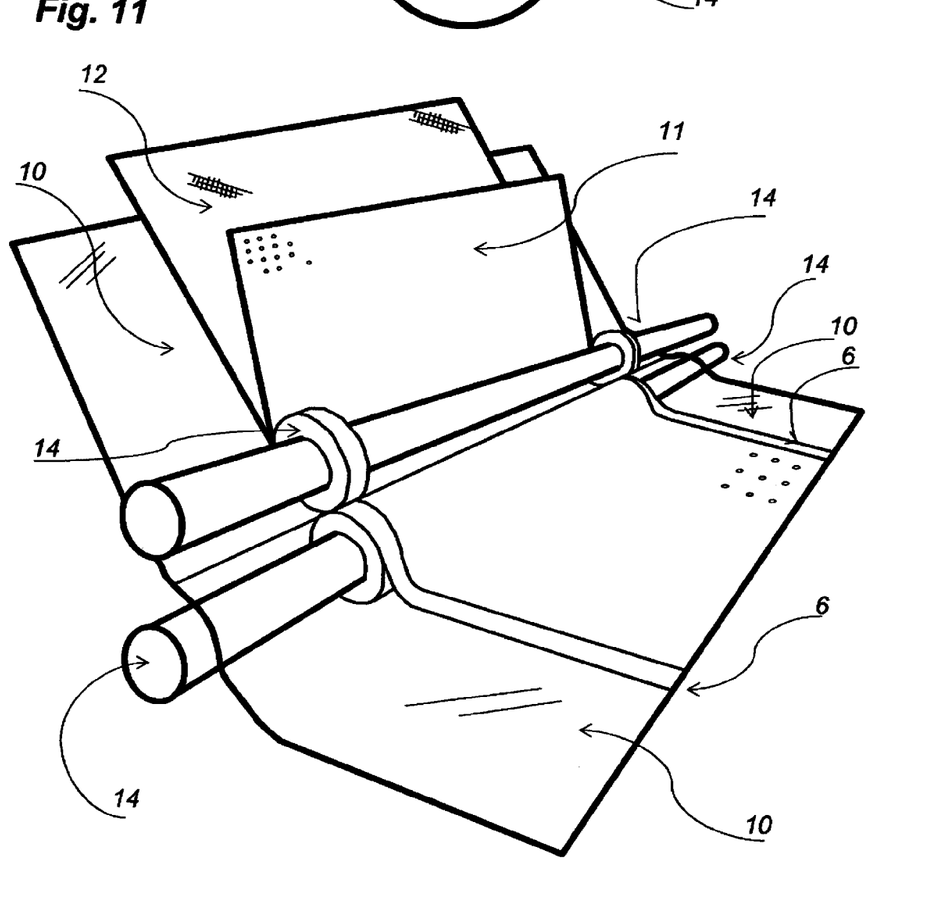
FIG. 11 is a perspective view of the heat-sealing process.

The lamination process of the polymeric films as well as the sealing thereof, is part of the invention presented herein. FIG. 10 and FIG. 11 show a section and perspective view of the heat sealing process, wherein different layers of plastic materials (10), (11), and (12) are passed through spinning metal rollers (14), wherein the sheets of plastic in the center (10), (11), and (12) are heat-sealed by applying pressure and heat with a temperature of 150° C. or by similar means, producing a single sheet (16) in a convenient area which will later be the bag for fruits and vegetables.

The packaging container for longer preservation of fruit and vegetables thus conceived is susceptible to numerous modifications and variants, all falling within the scope of the inventive step; moreover, all details are replaceable with technically equivalent elements.

In practice, due to their low cost, the materials used, preferably polyethylene (PE) (10), polypropylene (PP) non-woven fabric (12), and micro-perforated biaxially-oriented polypropylene (BOPP) (11), can be any material according to the requirements and the state of the art. An additional number of variants for material (12) can be achieved through the integration of absorbent materials such as but not limited to: cellulose, cotton, hemp, sugarcane bagasse, and similar materials. Furthermore, the layers of materials (11) or (12) can be increased in order to further regulate the water loss that takes place in fruits and vegetables.

The invention claimed is:

1. A packaging container designed to keep fruits and vegetables hydrated, comprising:
    a length of layered polymeric material which consists of a first layer of material with structural functions, having a first layer width, two outer edges, and a perforated central region, a second layer and a third layer each comprised of non-woven fabric or micro-perforated polymeric material, each having an inner layer width less than the first layer width and two inner layer edges, and each overlaying and being substantially centered on the first layer; and,
    the first layer being joined to the second layer and the third layer only along the entire length of the inner layer edges at a position offset from the outer edges.

2. The packaging container according to claim 1, wherein the third layer of material includes one or more layers of micro-perforated polymeric material depending on the amount of moisture retention desired.

3. The packaging container according to claim 1, wherein the second layer of material includes one or more layers of non-woven polymeric fabric material depending on the amount of moisture retention desired.

4. The packaging container according to claim 1, wherein the second layer of material is selected from the group consisting of: cellulose, cotton, sugarcane bagasse, and natural vegetable fibers, and includes one or more layers of the same material depending on the amount of moisture retention desired.

5. Method for making a packaging container designed to keep fruits and vegetables hydrated comprising the following steps:
    a) providing a first layer of polymeric material having two outer edges, and a second layer and a third layer of material each having two inner layer edges;
    b) joining the first layer to the second layer and third layer only along the entire length of the inner layer edges at a position offset from the outer edges, leaving the layers joined together but not laminated, forming a layered polymeric material;
    c) cutting the layered polymeric material into a plurality of cross-sections;
    d) joining the outer edges of the layered polymeric material to form a bag having a base; and,
    e) providing perforations in the base of the bag for moisture control.

* * * * *